United States Patent [19]

Fujii et al.

[11] Patent Number: 4,485,784
[45] Date of Patent: Dec. 4, 1984

[54] AN ENGINE IGNITION CONTROL CIRCUIT HAVING A FAILSAFE FOR A CRANK ANGLE SENSOR

[75] Inventors: Masahiko Fujii, Kanagawa; Yoshiaki Hirosawa, Samitama, both of Japan

[73] Assignees: New Nippon Electric Co., Ltd., Osaka; Honda Giken Kogyo Kabushiki Kaisha, Tokyo, both of Japan

[21] Appl. No.: 393,321

[22] Filed: Jun. 29, 1982

[30] Foreign Application Priority Data

Jun. 30, 1981 [JP] Japan .................................. 100414

[51] Int. Cl.³ .............................................. F02P 5/00
[52] U.S. Cl. .................................... 123/416; 123/414; 123/417; 123/643
[58] Field of Search .............. 123/414, 416, 417, 479, 123/612, 617, 640, 643, 146.5 A

[56] References Cited

U.S. PATENT DOCUMENTS 4,239,024 12/1980 Leichle .............................. 123/416
4,245,591 1/1981 Nishida et al. ..................... 123/416
4,317,437 3/1982 Lindgreu ............................ 123/414
4,378,004 3/1983 Petrie .................................. 123/414
4,378,771 4/1983 Jawada et al. ...................... 123/416
4,385,605 5/1983 Petrie et al. ........................ 123/414

FOREIGN PATENT DOCUMENTS 2916336 11/1980 Fed. Rep. of Germany ...... 123/414

Primary Examiner—Parsholem S. Lall
Attorney, Agent, or Firm—Staas & Halsey

[57] ABSTRACT

An engine ignition control circuit includes a crank angle sensor and two reference position sensors. The engine ignition control circuit also includes an ignition timing control unit generating primary ignition signals and a replacement ignition signal generator device. The control circuit further includes a crank angle monitoring circuit which detects the failure of the crank angle sensor and generates a malfunction signal. The malfunction signal controls a data selector which outputs either the primary ignition signals or the replacement ignition signals to drivers and ignition coils for the engine.

10 Claims, 7 Drawing Figures

AN ENGINE IGNITION CONTROL CIRCUIT HAVING A FAILSAFE FOR A CRANK ANGLE SENSOR

BACKGROUND OF THE INVENTION

The present invention relates to an ignition control circuit for an engine and, more particularly, to an ignition control circuit having a failsafe function which is activated when a crank angle sensor, for detecting the rotation of the crankshaft, is broken.

In recent years, with the advent of digital electronics, digital ignition controls for engines have been developed. For example, in a motorcycle both crank angle pulses, generated from each unit angle of rotation of a crankshaft, and reference position pulses, indicating the reference position of a crankshaft, are input into an electronically controlled ignition control circuit. The ignition control circuit counts the crank angle pulses with respect to the reference position pulses and thereby sets a dwell angle and controls ignition timing.

The crank angle pulses are generated by magnetic detecting teeth formed on an outer circumference of a crank angle rotor fixed to the crankshaft. A crank angle sensor detects the teeth which are set, for example, at a pitch of two degrees. The reference position pulses are generated by a reference position sensor which detects a tooth formed on an outer circumference of a reference position rotor fixed to the crankshaft.

In the above-described ignition control circuit, if the crank angle sensor breaks, the supply of crank angle sensor pulses is discontinued and the ignition signal cannot be generated.

SUMMARY OF THE INVENTION

It is an object of the present invention to provide an engine ignition control circuit which has a failsafe function which is activated when the crank angle pulses are blocked.

It is another object of the present invention to generate replacement ignition signals when the crank angle pulses are blocked.

The present invention includes a crank angle sensor that senses the crank angle of a crank angle rotor and two reference position sensors that detect a position of a reference position rotor. The invention also includes an ignition timing control means which generates primary ignition signals from the crank angle pulses and the reference position pulses. The invention further includes means for generating replacement ignition signals which replace the primary ignition signals when the crank angle pulses are blocked. The invention additionally includes means for detecting a malfunction of the crank angle sensor and generating a malfunction detection signal. The invention also includes means for selecting either the primary ignition signals or the replacement ignition signals in dependence upon the malfunction detection signal. The invention additionally includes drivers and ignition coils for generating the spark from the selected ignition signals.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
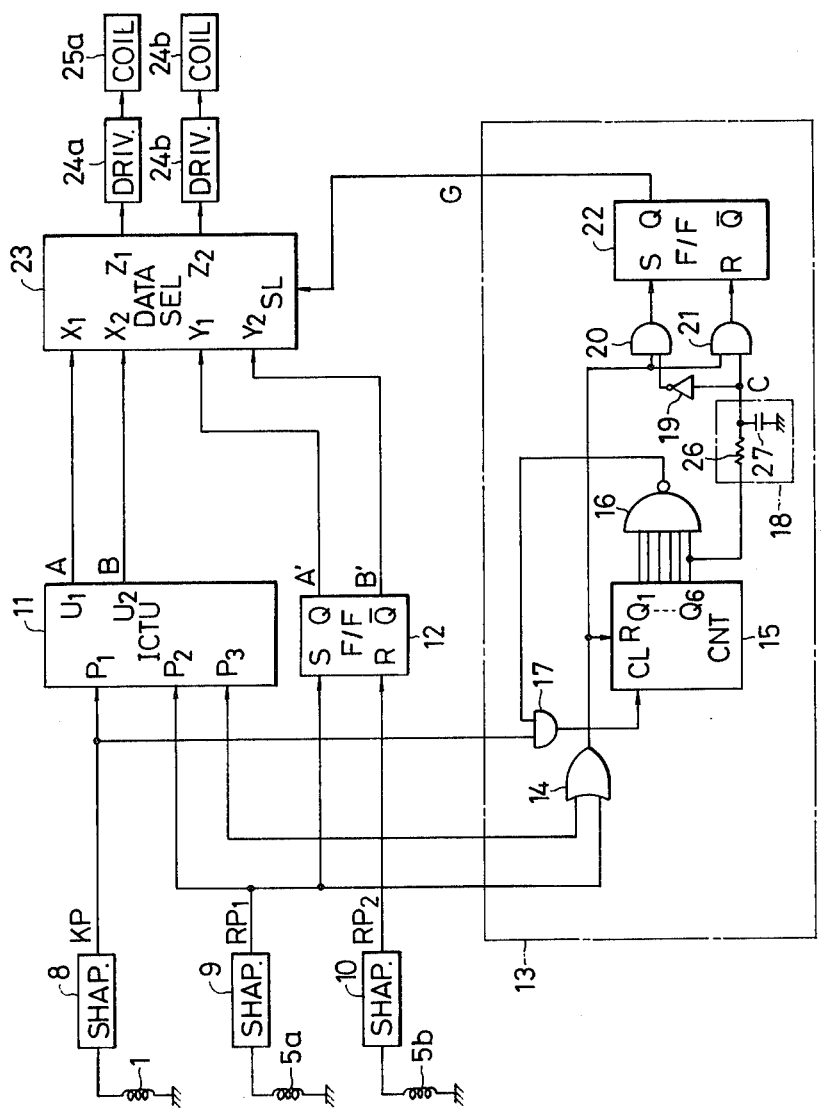
FIG. 1 is a circuit diagram illustrating an embodiment of an engine ignition control circuit according to the present invention.
Figure 2:
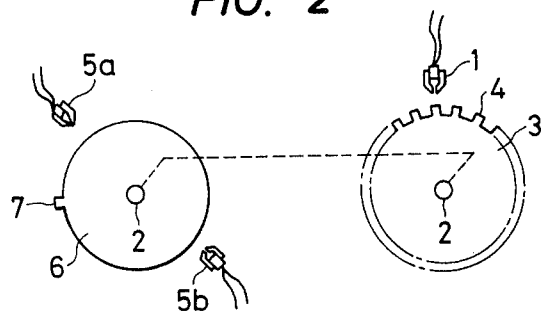
FIG. 2 is a side elevation diagram illustrating a relationship between mounting positions of a crank angle sensor and reference position sensors.

FIG. 1 is a circuit diagram illustrating an embodiment of an engine control circuit according to the present invention as applied to a series four-cylinder motorcycle engine. In FIG. 1, a crank angle sensor 1 is disposed in the vicinity of the outer circumference of a crank angle rotor 3 fixed to a crankshaft 2, as illustrated in FIG. 2. The crank angle sensor 1 magnetically detects the passage of teeth 4 of the crank angle rotor 3. Reference position sensors 5a and 5b are arranged at diametrically opposite positions on the outer circumference of a reference position rotor 6 secured to the crankshaft 2, as illustrated in FIG. 2. The reference position sensors 5a and 5b magnetically detect the passage of a tooth 7 formed on the outer circumference of the position rotor 6. As a result, outputs are alternately generated from the reference position sensors 5a and 5b each time the crankshaft 2 makes a half rotation. Tooth 7 of reference position rotor 6 indicates the position of a piston, and the respective reference position sensors 5a and 5b are so positioned as to detect tooth 7 about 10 degrees before top dead center of the piston.

Waveform shaping circuits 8, 9 and 10 shape the waveforms of the detected outputs of the crank angle sensor 1 and the reference position sensors 5a and 5b, thereby generating crank angle pulses KP and reference position pulses $RP_1$ and $RP_2$, respectively.

An ignition timing control unit 11 receives the crank angle pulses KP at input port $P_1$, and the reference position pulses $RP_1$ and $RP_2$ at input ports $P_2$ and $P_3$, respectively. The ignition timing control unit 11 starts counting the crank angle pulses based on the respective reference position pulses $RP_1$ and $RP_2$, thereby generating ignition signals A and B which have a predetermined dwell angle and ignition timing. The ignition signals A and B drive two ignition systems which are separated by a period of 180 degrees. Thus, the ignition signals A and B are generated with respect to the timing of the reference position signals $RP_1$ and $RP_2$, respectively, which are the reference position pulses.

Flip-flop circuit 12 is connected to the waveform shaping circuits 9 and 10 so that it is set by the reference position signal $RP_1$ and reset by the reference position signal $RP_2$. Flip-flop 12 generates replacement ignition signals A' and B' having opposite levels which are output from the set output terminal Q and the reset output terminal $\overline{Q}$.

A crank angle pulse monitoring unit 13 receives the crank angle pulses KP and the reference position pulses $RP_1$ and $RP_2$, and generates a malfunction detection signal G at a high level when it detects the discontinuation of the crank angle pulses KP. The crank angle pulse monitoring unit 13 includes a counter 1 which is reset by an output of an OR gate 14 which receives the reference position pulses $RP_1$ and $RP_2$. The crank angle pulse monitoring unit 13 also includes an AND gate 17 for determining the coincidence between the output of NAND gate 16, which receives the outputs Q1–Q6 of the counter 15, and the crank angle pulses KP. When the crank angle pulses KP are in coincidence with the output of the NAND gate 16, the crank angle pulses KP are fed to a clock input terminal CL of the counter 15. The crank angle pulse monitoring circuit further includes a delay circuit 18 for delaying the output Q6 of the counter 15, and a flip-flop 22 which is set by an output of AND gate 20. AND gate 20 determines a coincidence between the output of OR gate 14 and an output of the delay circuit 18 which passes through inverter 19. Flip-flop 22 is reset by an output of AND gate 21. AND gate 21 determines a coincidence of the output of the OR gate 14 and the output of the delay circuit 18. A set output Q of the flip-flop 22 is used as the malfunction detection signal G which is input to a data selector 23. The data selector 23 selects, during a normal state, the ignition signals A and B from the timing control unit 11 and feeds the ignition signal to drivers 24a and 24b. During a malfunction state, the data selector 23 selects the replacement signals A' and B' from the flip-flop 12 when the malfunction detection signal G is input through a select input terminal SL.

Ignition coils 25a and 25b are driven by drivers 24a and 24b and generate high voltages. In the series four-cylinder engine of the motorcycle, the high voltage output of ignition coil 25a is fed simultaneously to ignition plugs which are mounted in first and fourth cylinders which are at opposite stroke cycles (e.g., the compression and exhaust strokes). While the high voltage output of ignition coil 25b is fed simultaneously to ignition plugs which are mounted in the second and third cylinders also at opposite ends of their stroke cycles.

Figure 3:
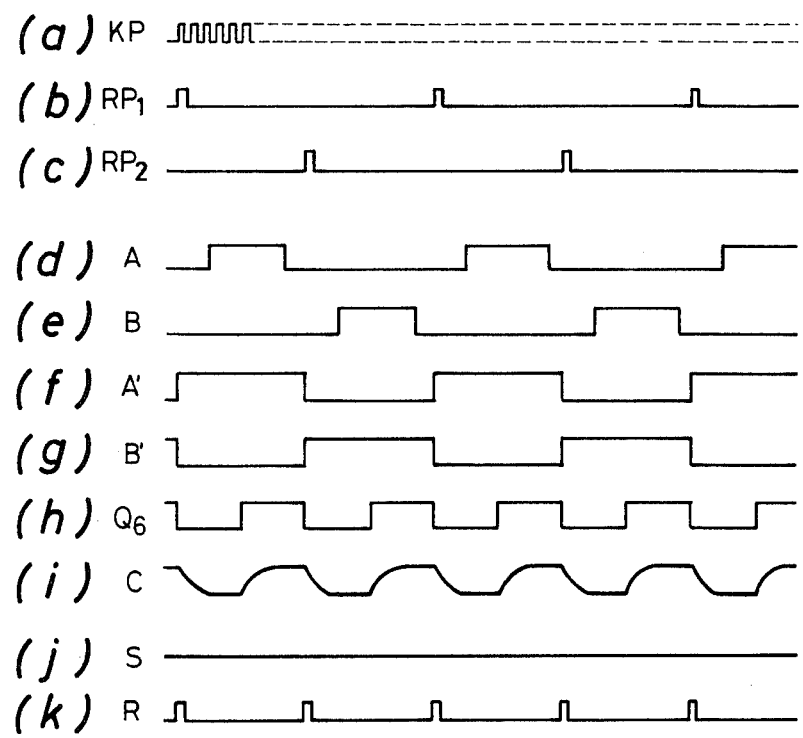
FIGS. 3(a)–3(k), are time charts illustrating waveforms generated at respective portions generated at the circuit illustrated in FIG. 1.

In the above-described ignition control circuit, above-described. when the crankshaft 2 is rotated, the crank rotor 3 and the reference position rotor 6, which are both fixed to the crankshaft 2, are also rotated. As a result, the crank angle sensor 1 detects passage of the teeth 4 of the crank angle rotor, thereby generating a signal having a period corresponding to the rotational speed of the crankshaft 2. The signal output by the crank angle sensor 1 has its waveform shaped into pulses by the waveform shaping circuit 8 and output as the crank angle pulses KP at a pitch of 2 degrees, as illustrated in FIG. 3(a).

Since the reference position sensors 5a and 5b are arranged at diametrically opposite positions, they alternately detect the single tooth 7 which is formed on the reference position rotor 6, and generate an output each time the crankshaft 2 is rotated 180 degrees. The outputs of the reference position sensors 5a and 5b have their waveforms shaped into respective pulses by the waveform shaping circuits 9 and 10, respectively, and are output as reference position signals $RP_1$ and $RP_2$ as illustrated in FIGS. 3(b) and 3(c). When the reference position pulses $RP_1$ and $RP_2$ are input to input ports $P_2$ and $P_3$ of the ignition timing control unit 11, the ignition timing control unit 11 counts the crank angle pulses KP to set the dwell angle and the ignition timing, and outputs the ignition signals A and B, as illustrated in FIGS. 3(d) and 3(e). The flip-flop circuit 12 receives the reference position pulses $RP_1$ at its set input and the reference position pulses $RP_2$ at its reset input so that the flip-flop 12 always outputs, at its set output terminal Q, and its reset output terminal $\overline{Q}$, the replacement ignition signals A' and B' (illustrated in FIGS. 3(f) and 3(g)), which respectively contain the generation periods of the ignition signals A and B.

Figure 5:
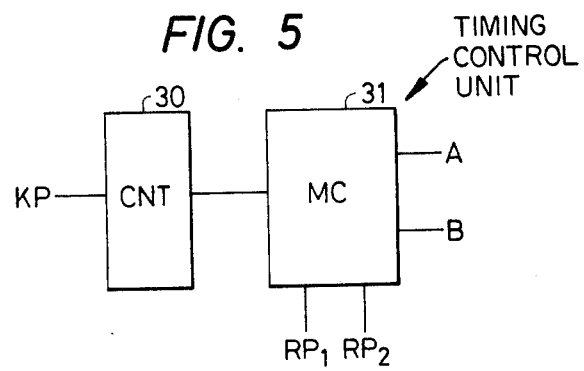
FIG. 5 is a block diagram illustrating an ignition timing control unit.
Figure 6:
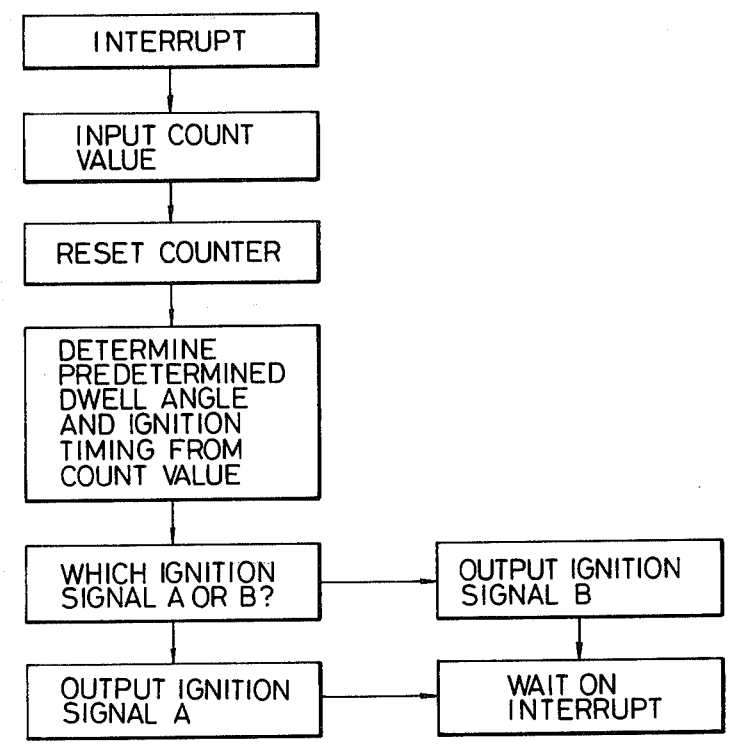
FIG. 6 is a flow chart illustrating the operation of a microcomputer.

The ignition timing control unit 11, as illustrated in FIG. 5, includes a counter 30 which counts the crank angle pulses and a microcomputer 31 which is interrupted by the reference position pulses $RP_1$ and $RP_2$. When the microcomputer 31 is interrupted, it inputs the value counted by the counter 30 and determines the dwell angle and ignition timing from the counted value based on predetermined values. The microcomputer 31 then outputs the ignition signals A or B depending upon which reference pulse caused the interrupt. The microcomputer 31 after inputting the counted value also resets the counter so that it can begin to count again. A flow chart illustrating the microcomputer process is illustrated in FIG. 6.

The counter 15, which is included in the crank angle pulse monitoring unit 13, consecutively counts the crank angle pulses KP which are passed through the AND gate 17 after the counter 15 has been reset by the reference position pulses $RP_1$ or $RP_2$ passed through the OR gate 14. When the counted value reaches 128 (i.e., when all the outputs of the output terminals Q1 to Q6 have a value "1"), the output of the NAND gate 16 is inverted to a low level so that the AND gate 17 is closed, thus stopping the counting operation until the counter 15 is reset by subsequent reference position pulses $RP_1$ and $RP_2$. When the counter 15 counts 64 (i.e., when crank shaft 2 rotates 128 degrees) pulses from the rise of the reference pulse $RP_1$ or $RP_2$ the output Q6 becomes high. The output Q6 remains high until the subsequent reference pulse $RP_1$ or $RP_2$ is generated, as illustrated in FIG. 3(h). The output from terminal Q6 of counter 15 is delayed and becomes a delay signal C, as illustrated in FIG. 3(i), output by the delay circuit 18 which has an integrator type construction and which is comprised of a resistor 26 and a capacitor 27. The delay signal C is passed through an inverter 19 to the AND gate 20. However, the coincidence between the reference position pulses $RP_1$ or $RP_2$, which are passed through the OR gate 14, cannot be achieved, because the delay signal C is delayed and inverted, so that a set input signal S of the flip-flop circuit 22 is held at a low state as illustrated in FIG. 3(j). Since the AND gate 21 receives the delay signal C without inversion, this delay signal C is in coincidence with a portion of the reference position pulses $RP_1$ or $RP_2$ passed through the OR gate 14, so that reset pulses R, illustrated in FIG. 3(k), are passed to the flip-flop circuit 22 upon the generation of each of the reference position pulses $RP_1$ and $RP_2$. As a result, when the crank angle pulses KP are normally generated, the flip-flop circuit 22 is held at its reset state, so that the signal output by the set output terminal Q is held at the low level.

The data selector 23, when the control input terminal SL is at the low level, selects the primary ignition signals A and B which are output by the timing control unit 11 and input through terminals $X_1$ and $X_2$. The selector feeds the selected signals to the drivers 24a and 24b. As a result, the ignition coil 25a and 25b are driven by the primary ignition signals A and B which have the dwell angle and the ignition timing controlled at the proper values.

Figure 7:
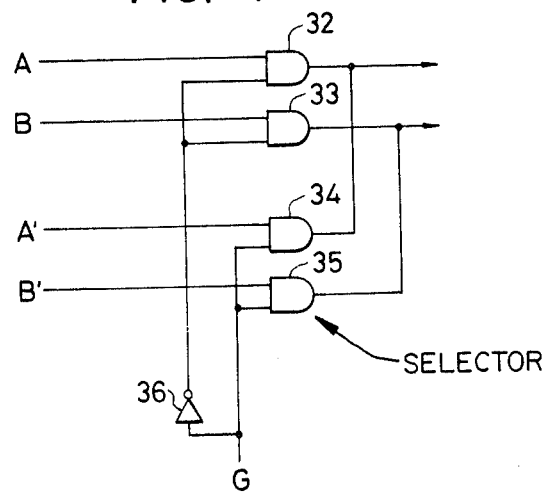
FIG. 7 is a circuit diagram illustrating a data selector.

The data selector 23, as illustrated in FIG. 7, includes inverter 36 which receives the malfunction detection signal G. The data selector also includes AND gates 32, 33, 34 and 35 which receive the primary ignition signals A and B and the replacement ignition signals A' and B'.

If the crank angle pulses KP are blocked for some reason, such as the breaking of the crank angle sensor 1, the ignition timing control unit 11 cannot perform the necessary counting using the crank angle pulses KP as its clock, so that setting the dwell angle and the ignition timing does not occur. As a result, the ignition timing control unit 11 does not generate the primary ignition signals A and B.

According to the present invention, however, the replacement ignition signals A' and B', as illustrated in 3(g) and 3(f), are always generated by the flip-flop circuit 12, which receives the reference position pulses $RP_1$ and $RP_2$ at its set and reset inputs. The data selector 23 changes to the backup replacement ignition signals A' and B' when the crank angle pulses KP are blocked. This change operation will be described hereinafter.

Figure 4:
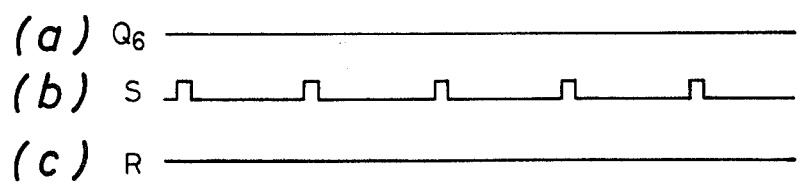
FIGS. 4(a)–4(c) are time charts illustrating waveforms of respective portions of the circuit illustrated in FIG. 1.

If the crank angle pulses KP are blocked, the signal to the clock input terminals CL of the counter 15 disappears, so that the counting operation of the counter 15 is interrupted. As a result, the output signal at the output terminal Q6 of the counter 15 remains at the low level as illustrated in FIG. 4(a). As a further result, the output of the inverter 19 continues at its high level, so that the AND gate 20 passes the set signal S, as illustrated in FIG. 4(b), to the flip-flop circuit 22 each time the reference signals $RF_1$ or $RP_2$ are passed through the OR gate 14. At the same time, the delay signal C output by the delay circuit 18 is held at the low level, so that the reset signal R output by the AND gate 21 to the flip-flop 22 is held at the low level, as illustrated in FIG. 4(c). As a result, flip-flop circuit 22 is continuously set by the set signal S which the flip-flop circuit 22 receives upon each generation of the reference position pulses $RP_1$ and $RP_2$, so that the set output from the terminal Q is inverted to the high level to output the malfunction detection signal G. If the malfunction detection signal G is generated, the data selector 23 changes from selecting the primary ignition signals A and B, which are input at the input terminals $X_1$ and $X_2$, to selecting the replacement ignition signals A' and B', which are input at the input terminals $Y_1$ and $Y_2$. Thus, when the crank angle pulses KP are blocked, the replacement ignition signals A' and B' are selected and passed to drivers 24a and 24b, respectively, so that the ignition coils 25a and 25b are accordingly driven to effect the ignitions even when the crank angle pulses KP are blocked. In this case, the replacement ignition signals A' and B' are generated with each rotation of 180 degrees made by the crankshaft 2 based on the reference position pulses $RP_1$ and $RP_2$. As a result, the dwell angle is 180 degrees and the ignition timing is fixed at the instant when the reference position pulses $RP_1$ and $RP_2$ are generated. Therefore, it is necessary that the reference position pulse generation conditions be included in the limit conditions necessary for the engine ignition control. In the foregoing embodiment, the description has been directed to the case where the present invention is applied to the series four-cylinder engine of a motorcycle. However, the present invention is not limited thereto but can be applied to other types of engines including engines of four wheel vehicles.

As has been above-described, in an engine ignition control circuit according to the present invention, the dwell angle and ignition timing are controlled by counting crank angle pulses generated from each unit angle rotation of a crankshaft based upon the generation of reference position pulses. The reference position pulses are generated in association with a cylinder position of each cylinder and replacement ignition signals are generated based upon the reference position pulses. The replacement ignition pulses are used to drive the ignition coils when the crank angle pulses are blocked. This invention results in an excellent effect in that a backup is insured when the crank angle pulses are blocked.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. An engine ignition control circuit, operatively connected to an engine crank by a crank angle rotor and to an ignition coil, comprising:

a crank angle sensor positioned across from the crank angle rotor, sensing and angle of the engine crank and generating crank angle signals therefrom;

reference position detection means for generating reference position signals in dependence upon a position of the engine crank;

ignition timing control means, operatively connected to said crank angle sensor and said reference position detection means, for generating primary ignition signals in dependence upon the crank angle signals and the reference position signals;

replacement ignition signals generation means, operatively connected to said reference position detection means, for generating replacement ignition signals, in dependence upon the reference position signals, as back-up for the primary ignition signals when the crank angle signals fail;

crank angle signal monitoring means, operatively connected to said crank angle sensor and said reference position detection means, for generating a malfunction detection signal when the crank angle signals fail; and data selector means, operatively connected to said ignitiion timing control means, said replacement ignition signal generation means, said crank angle signal monitoring means and the ignition coil, for selecting and passing therethrough as ignition control signals and the primary ignition signals or the replacement ignition signals in dependence upon the malfunction detection signal, thereby replacing the primary ignition signals with the replacement ignition signals when the crank angle signals fail.

2. An engine ignition control circuit as recited in claim 1, wherein said crank angle signal monitoring means comprises:

an OR gate operatively connected to said reference position detection means;

a first AND gate operatively connected to said crank angle sensor;

a counter, operatively connected to said OR gate and said first AND gate, having outputs;

a NAND gate operatively connected to the outputs of said counter and said first AND gate;

a delay circuit operatively connected to one of the outputs of said counter;

an inverter operatively connected to said delay circuit;

a second AND gate operatively connected to said OR gate and said inverter;

a third AND gate operatively connected to said delay circuit and said OR gate; and a flip-flop operatively connected to said second AND gate, said third AND gate and said data selector means.

3. An engine ignition control circuit as recited in claim 1, wherein said replacement ignition signal generation means comprises a flip-flop operatively connected to said reference position detection means and said data selector means.

4. An engine ignition control circuit as recited in claim 1,
wherein said engine crank has a reference position rotor attached thereto,
wherein said reference position detection means comprises:
a first reference position sensor positioned next to the reference position rotor, sensing the position of the engine crank and generating a first reference position signal in dependence thereon;
a second reference position sensor positioned next to the reference position rotor, sensing the position of the engine crank and generating a second reference position signal in dependence thereon;
a first waveform shaping circuit, operatively connected to said first reference position sensor, said ignition timing control means, said crank angle signal monitoring means and said replacement ignition signal generation means; and
a second waveform shaping circuit, operatively connected to said second reference position sensor, said ignition timing control means, said crank angle monitoring means and said replacement ignition signal generation means.

5. An engine ignition control circuit as recited in claim 1, wherein said ignition timing control means comprises;
a counter, operatively connected to the crank angle sensor, for counting the crank angle signals; and
a processor, operatively connected to said counter and said data selector means, for outputting the primary ignition signals in dependence upon the number of crank angle signals counted.

6. An engine ignition control circuit as recited in claim 1, wherein said data selector means comprises:
an inverter operatively connected to said crank angle signal monitoring means;
a first AND gate operatively connected to said inverter and the ignition coil; and
a second AND gate operatively connected to said crank angle signal monitoring means and to said ignition coil.

7. An engine ignition control circuit as recited in claim 1, 2, 3, 4, 5 or 6, further comprising:
a waveform shaping circuit, operatively connected to said crank angle sensor, said ignition timing control means and said crank angle signal monitoring means;

a driver circuit operatively connected to said data selector means; and said ignition coil operatively connected to said driver circuit.

8. An engine ignition control circuit operatively connected to an engine crank and an ignition coil comprising:
a crank angle sensor positioned next to the engine crank, sensing the angle of the engine crank and generating crank angle signals therefrom;
reference position detection means for generating reference position signals in dependence upon the position of the engine crank;
ignition timing control means, operatively connected to said crank angle sensor and said reference position detection means, for generating primary ignition signals in dependence upon the crank angle signals and the reference position signals; and
means, operatively connected to said crank angle sensor, said reference position detection means, said ignition timing control means and the ignition coil, for generating and outputting primary ignition signals, for detecting the failure of the crank angle sensor and for generating and outputting replacement ignition signals when the crank angle sensor fails, the primary ignition signals or the replacement ignition signals being ignition control signals.

9. An engine ignition control circuit, operatively connected to an engine crank by a crank angle rotor and to an ignition coil, comprising:
a crank angle sensor positioned across from the crank angle rotor, sensing an angle of the engine crank and generating crank angle signals therefrom;
reference position detection means for generating reference position signals in dependence upon a position of the engine crank;
ignition timing control means, operatively connected to said crank angle sensor and said reference position detection means, for generating primary ignition signals in dependence upon the crank angle signals and the reference position signal;
replacement ignition signal generation means, operatively connected to said reference position detection means, for generating replacement ignition signals in dependence upon the reference position signals;
crank angle signal monitoring means, operatively connected to said crank angle sensor and said reference position detection means, for generating a malfunction detection signal in dependence upon the crank angle signals and the reference position signals, said crank angle signal monitoring means comprising:
an OR gate operatively connected to said reference position detection means;
a first AND gate operatively connected to said crank angle sensor;
a counter, operatively connected to said OR gate and said first AND gate, having outputs;
a NAND gate operatively connected to the outputs of said counter and said first AND gate;
a delay circuit operatively connected to one of the outputs of said counter;
an inverter operatively connected to said delay circuit;

a second AND gate operatively connected to said delay circuit and said OR gate;

a third AND gate operatively connected to said delay circuit and said OR gate; and a flip-flop operatively connected to said second AND gate and said third AND gate; and data selector means, operatively connecte said ignition timing control means, said replacement ignition signal generation means, said flip-flop of said crank angle signal monitoring means and the ignition coil, for selecting and passing therethrough as ignition control signals the primary ignition signals or the replacement igntion signals in dependence upon the malfunction detection signal.

10. An engine ignition control circuit as recited in claim 9, further comprising:

a waveform shaping circuit, operatively connected to said crank angle sensor, said ignition timing control means and said crank angle signal monitoring means;

a driver circuit operatively connected to said data selector means; and said ignition coil operatively connected to said driver circuit.

* * * * *

UNITED STATES PATENT AND TRADEMARK OFFICE
CERTIFICATE OF CORRECTION

PATENT NO. : 4,485,784
DATED : DECEMBER 4, 1984
INVENTOR(S) : MASAHIKO FUJII ET AL.

It is certified that error appears in the above-identified patent and that said Letters Patent is hereby corrected as shown below:

Col. 6, line 32, "and" should be --an--;
      line 42, "signals" should be --signal--;
      line 55, "ignitiion" should be --ignition--.

Col. 9, line 7, "connecte" should be --connected to--.

Col. 10, line 1, "igntion" should be --ignition--.

Signed and Sealed this

Thirtieth Day of July 1985

[SEAL]

Attest:

DONALD J. QUIGG

Attesting Officer     Acting Commissioner of Patents and Trademarks